US009181865B2

(12) United States Patent
Richardson et al.

(10) Patent No.: US 9,181,865 B2
(45) Date of Patent: Nov. 10, 2015

(54) ELECTRICAL GENERATOR WITH IMPROVED COOLING AND EXHAUST FLOWS

(75) Inventors: Christine Richardson, Delavan, WI (US); Michael Bechtel, West Allis, WI (US); Joel Wray, Janesville, WI (US); Jonathan Gohde, Whitewater, WI (US); Billy Brandenburg, Horicon, WI (US); Leonard Pilling, Racine, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 356 days.

(21) Appl. No.: 13/008,655

(22) Filed: Jan. 18, 2011

(65) Prior Publication Data

US 2011/0272952 A1 Nov. 10, 2011

Related U.S. Application Data

(60) Provisional application No. 61/295,961, filed on Jan. 18, 2010.

(51) Int. Cl.
*H02K 7/18* (2006.01)
*F02B 63/04* (2006.01)

(52) U.S. Cl.
CPC ............... *F02B 63/04* (2013.01); *F02B 63/044* (2013.01)

(58) Field of Classification Search
CPC ............................... F02B 63/04; F02B 63/044
USPC ........ D13/101, 112, 114, 118, 122, 184, 199; 290/1 A, 1 B, 1 R; 123/41.31, 41.49, 123/41.56, 41.62, 41.63, 41.64, 41.65, 123/41.66, 41.7; 60/39.83, 806
See application file for complete search history.

(56) References Cited

U.S. PATENT DOCUMENTS

| | | | | | |
|---|---|---|---|---|---|
| 3,675,379 | A * | 7/1972 | Lambert et al. | ................. | 52/264 |
| 4,243,893 | A * | 1/1981 | Sten | .............................. | 290/1 B |
| 4,548,164 | A * | 10/1985 | Ylonen et al. | .................... | 123/2 |
| 4,677,940 | A * | 7/1987 | Bracht et al. | ...................... | 123/2 |
| 5,515,816 | A * | 5/1996 | Ball et al. | ..................... | 123/41.7 |
| 5,965,999 | A | 10/1999 | Frank | | |
| 6,310,404 | B1 * | 10/2001 | Frank | ............................ | 290/1 A |
| 6,376,944 | B1 * | 4/2002 | Grizzle et al. | .................. | 310/52 |
| 6,952,056 | B2 | 10/2005 | Brandenburg et al. | | |
| 6,998,725 | B2 | 2/2006 | Brandenburg et al. | | |
| 7,314,397 | B2 * | 1/2008 | Sodemann et al. | ......... | 440/89 R |
| 2002/0153798 | A1 * | 10/2002 | Hatz et al. | ..................... | 310/191 |
| 2005/0029815 | A1 | 2/2005 | Brandenburg et al. | | |
| 2005/0264014 | A1 * | 12/2005 | Brandenburg et al. | ....... | 290/1 A |
| 2006/0055173 | A1 | 3/2006 | Gianfranco | | |
| 2008/0081524 | A1 * | 4/2008 | Kasai et al. | ................. | 440/88 A |

* cited by examiner

*Primary Examiner* — Tulsidas C Patel
*Assistant Examiner* — Sean Gugger
(74) *Attorney, Agent, or Firm* — Boyle Fredrickson, S.C.

(57) ABSTRACT

An electrical generator has an internal combustion engine and an alternator mounted to the engine and operative to generate electrical power during running of the engine. The alternator and the engine are arranged vertically to reduce the footprint of the electrical generator. The components of the electrical generator are contained within an enclosure defined by a base panel, a set of upright side panels, and a roof panel. When the roof panel is removed, each of the side panels can be independently removed from engagement with the base panel, which allows for easier access to the components of the electrical generator, such as for maintenance, service, and repair. The components are arranged so that cooling and exhaust air flow paths are defined within the enclosure.

20 Claims, 9 Drawing Sheets

ELECTRICAL GENERATOR WITH IMPROVED COOLING AND EXHAUST FLOWS

CROSS-REFERENCE TO RELATED APPLICATION

This application claims the benefit of U.S. Ser. No. 61/295,961 filed Jan. 18, 2010, the disclosure of which is incorporated herein by reference.

BACKGROUND AND SUMMARY OF THE INVENTION

Electrical generators are used in a wide variety of applications. Typically, an electrical generator operates in a stand-by mode wherein the electrical power provided by a utility is monitored such that if the commercial electrical power from the utility fails or is otherwise interrupted for a certain period of time, the engine of the electrical generator is started, either automatically or manually by a customer, causing the electrical generator to supply emergency or backup electrical power. More particularly, the engine drives an alternator to provide electrical current to power selected electrical loads that are connected to the electrical generator, which is typically through a dedicated electrical panel, i.e., transfer panel.

When the electrical power generated by the alternator reaches a predetermined voltage and frequency desired by the customer, a transfer switch transfers the load imposed by the customer from the commercial power lines to the electrical generator. The electrical generator then supplies electrical power to selected loads, which are typically deemed to be critical loads, such as HVAC equipment, refrigerator(s), lighting, and, if applicable, medical equipment.

In a typical installation, the electrical generator will be located adjacent an exterior wall of a home, building, garage, or similar structure. Many consumers find the electrical generator aesthetically unappealing and, as such, will often place the electrical generator in a location that is hidden from view altogether or use various plantings, e.g., shrubs, around the electrical generator to soften its view. Decreasing the size, or footprint, of the electrical generator would make it easier to "hide" the electrical generator; however, reducing the size of the electrical generator can result in an electrical generator that provides less electrical power.

One of the challenges faced by engineers in designing smaller electrical generators without sacrificing power output is preventing overheating of various temperature sensitive components of the electrical generator. If these components are not cooled effectively, the components may fail and render the electrical generator inoperative. While effective in providing thermal control, heat sinks, fans, and coolant circulations systems can ultimately add to the size of the electrical generator and, in the case of using multiple or larger fans, greater noise emissions.

In addition to smaller electrical generators, many consumers are demanding electrical generators that are constructed to be more user-friendly. That is, the components of conventional electrical generators will typically be contained within an integrated, and often heavy, housing that is difficult for a consumer to disassemble or remove to access the components of the electrical generator, such as for inspection, maintenance, and service. Alternately, many electrical generators will have dedicated access panels that may be removed to provide user access to selected components of the electrical generator. In both instances, servicing or repairing the electrical generator can be difficult for those of conventional design.

The present invention is directed to a fuel powered, electrical generator and, more particularly, to a vertical fuel powered, electrical generator. The invention provides an electrical generator having a smaller footprint than conventional horizontal generators and has a unique frame construction that allows for easier access to the components of the electrical generator, such as for maintenance, service, and repair. Additionally, in accordance with one embodiment of the invention, the electrical generator has an internal combustion engine with a crankcase that is configured in a manner that allows the alternator of the electrical generator to be mounted directly to the crankcase. In this embodiment, the invention avoids the need for a separate mount or similar member that is otherwise typically used to couple the alternator to the engine. Furthermore, as will be described more fully below, the present invention provides an electrical generator having improved airflow characteristics for better thermal control.

Therefore, in accordance with one aspect of the invention, an electrical generator includes an internal combustion engine that provides mechanical energy to an alternator mounted directly to the engine and that generates electrical power from the mechanical energy.

In accordance with another aspect of the invention, an electrical generator has an internal combustion engine and an alternator mounted to the engine. The engine has an output shaft that extends along a vertical axis and interconnects with a rotor of the alternator.

According to another aspect of the invention, an electrical generator includes an engine and an alternator operatively associated with the engine to create electric power during operation of the engine. The electrical generator further includes an enclosure for the engine and the alternator, and has a base panel, a roof panel, and a plurality of side panels. Openings are formed in at least one of the side panels. The electrical generator further comprises an engine and alternator cooling system configured to provide cooling air to the engine and the alternator. The cooling system provides a first cooling path in which air is drawn through an opening formed in a side panel of the enclosure and is pulled downward through the engine to provide cooling for the engine and a second cooling path in which air is drawn through an opening formed in a side panel of the enclosure and is pulled downward through the alternator to provide cooling for the alternator. Some of the air that is passed through the engine or the alternator is used to provide cooling for other components of the electrical generator contained within the enclosure.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

The drawings illustrate the best mode presently contemplated of carrying out the invention.

In the drawings.

DETAILED DESCRIPTION

Figure 1:
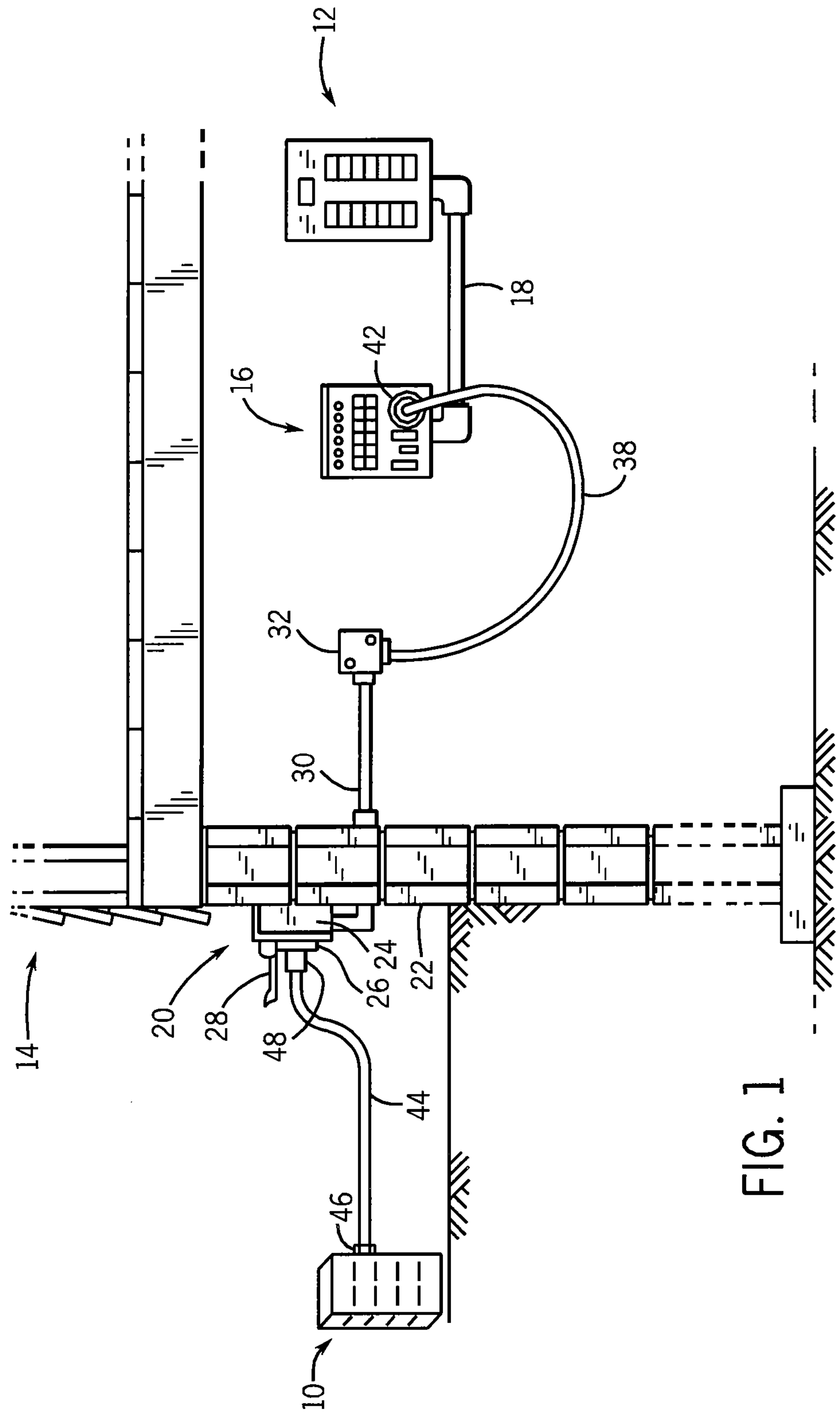
FIG. 1 is a schematic representation of a standby or emergency power supply system that supplies electrical power to an electrical system during interruption of utility power.
Figure 2:
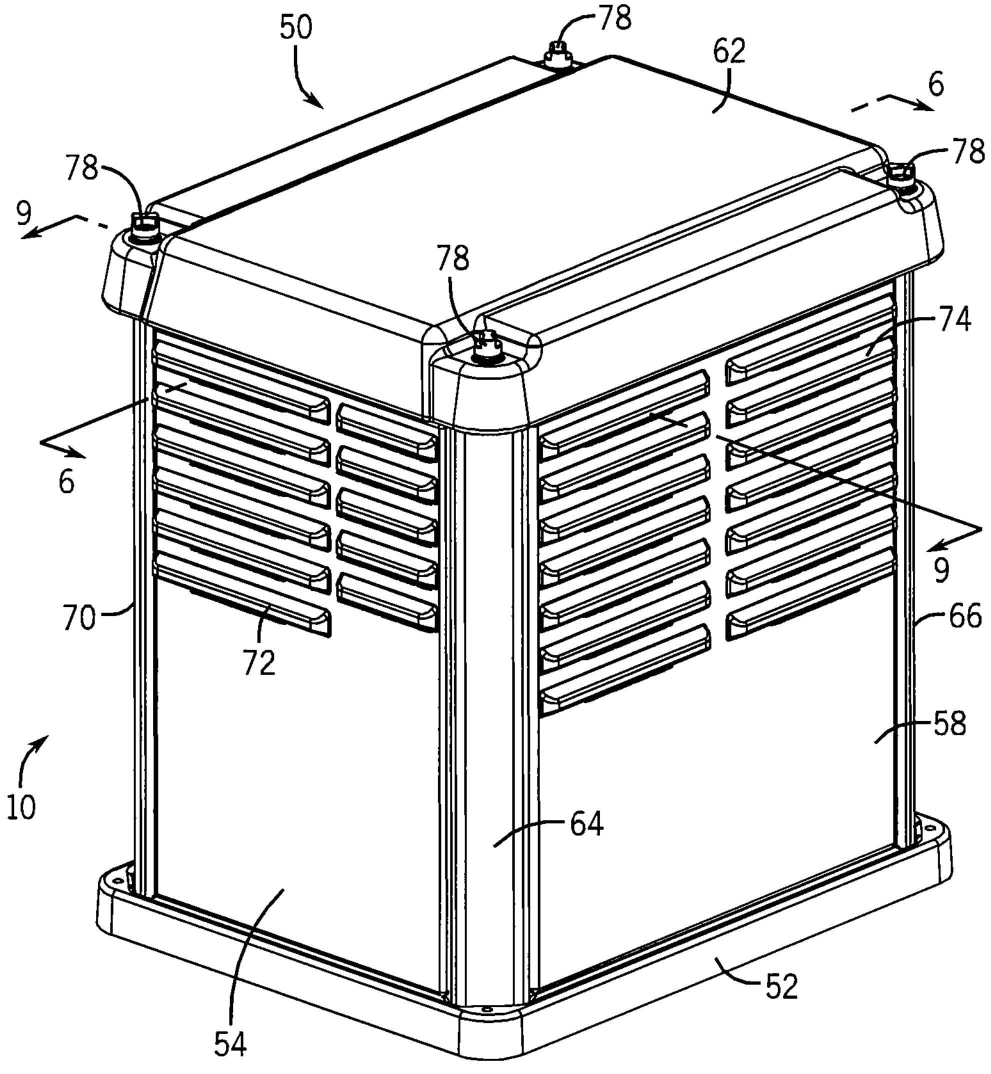
FIG. 2 is an isometric view of an electrical generator for use with the emergency power supply system of FIG. 1 according to one embodiment of the invention.
Figure 3:
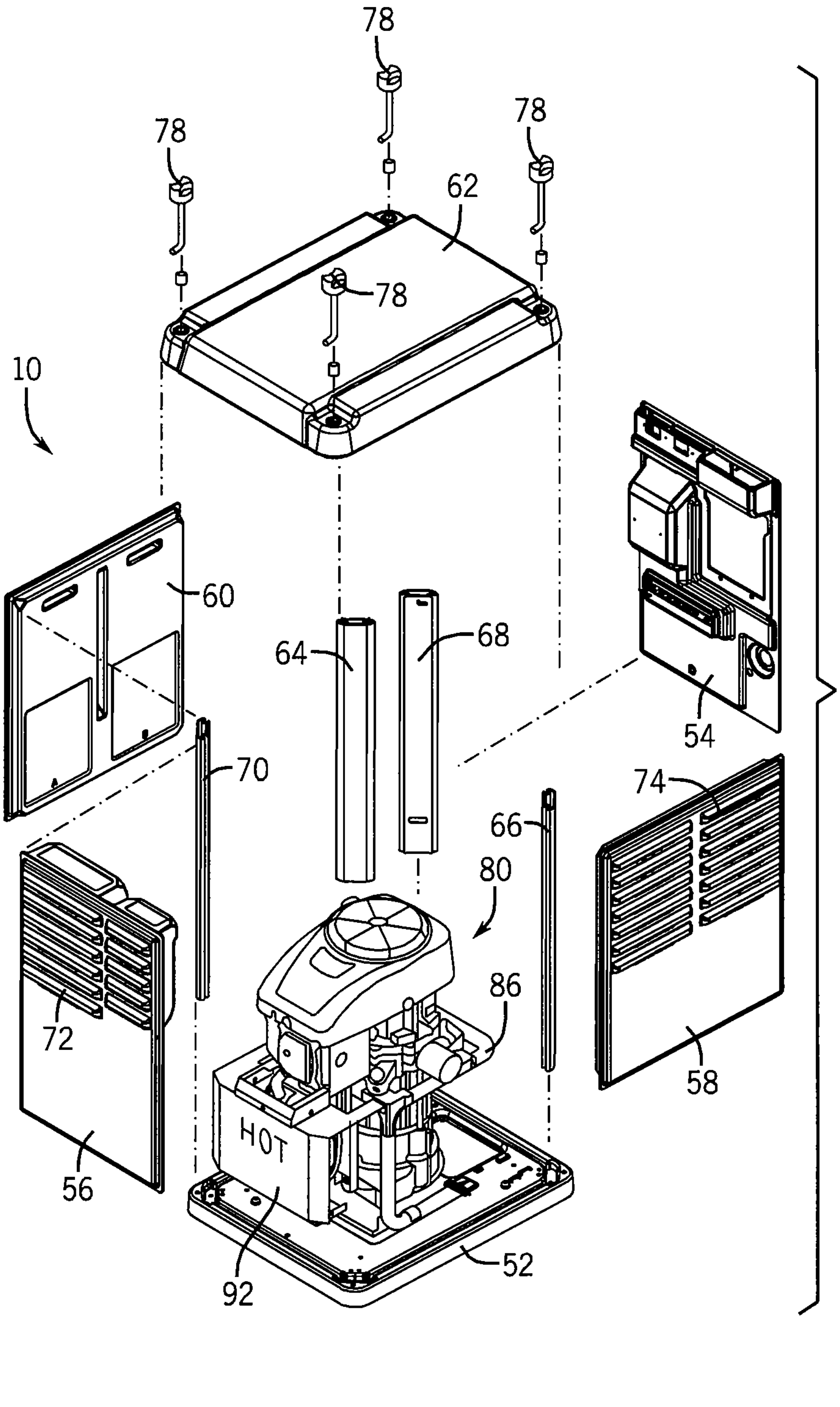
FIG. 3 is an exploded view of an enclosure structure of the electrical generator of FIG. 2.
Figure 4:
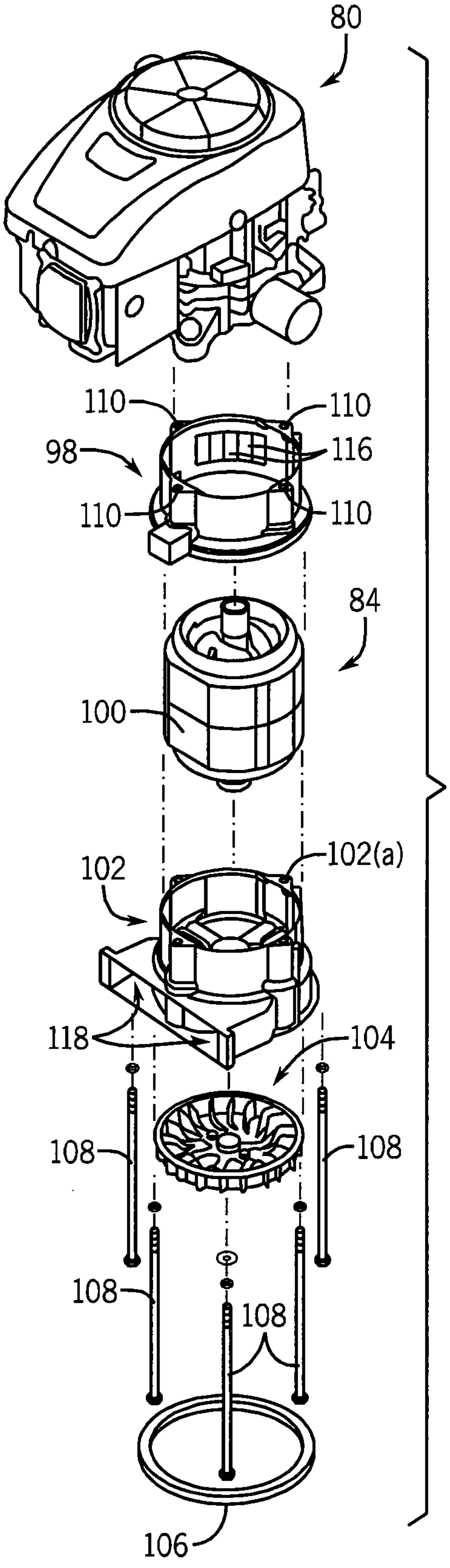
FIG. 4 is an exploded view of a power block of the electrical generator of FIG. 3 having a vertically oriented internal combustion engine and alternator according to one aspect of the invention.
Figure 5:
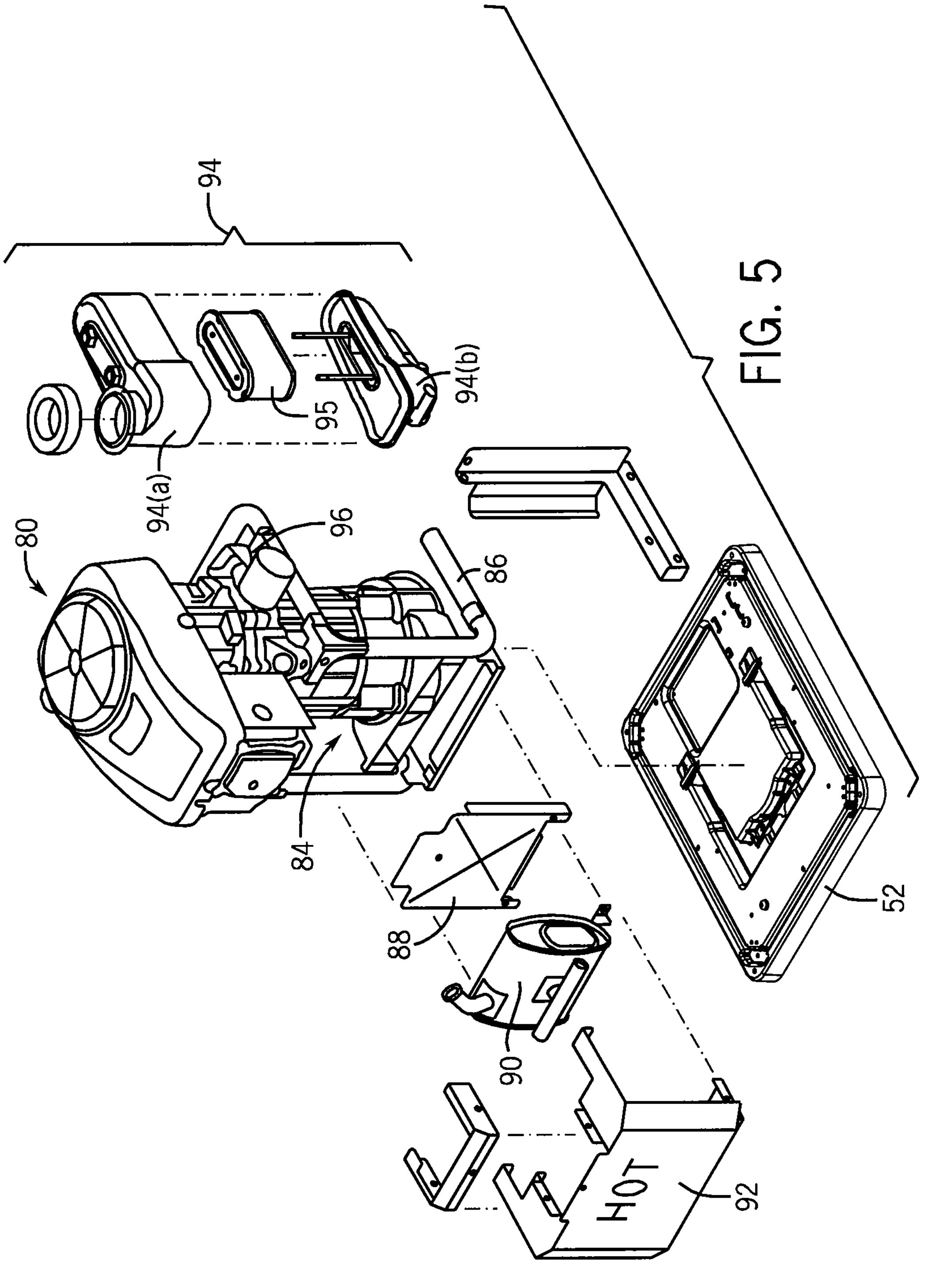
FIG. 5 is an exploded view of a cooling and exhaust system for the power block of FIG. 4 according to another aspect of the invention.

FIG. 1 shows a power inlet arrangement for interconnecting an electrical generator 10 with a main electrical panel or load center 12 located in the interior of a building 14. In the power inlet arrangement of FIG. 1, a power transfer panel 16 is mounted adjacent main panel 12, and is interconnected therewith via a series of wires enclosed by a conduit 18 extending between main panel 12 and transfer panel 16.

A power inlet box 20 is mounted to the wall of building 14, shown at 22. Power inlet box 20 includes an external housing including a series of walls such as 24, and a receptacle 26 mounted to a front wall of the housing. A cover 28 is mounted to the front wall of the housing via a hinge structure, and is movable between an open position as shown in FIG. 1 and a closed position in which cover 28 encloses receptacle 26 when not in use. A conduit 30 extends between inlet box 20 and a junction box 32, and a flexible cord 38 is attached at one end to junction box 32. At its opposite end, flexible cord 38 has a connector 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with receptacle 26 for transferring power generated by generator 10 to power inlet box 20, which is then supplied through the wiring in conduit 30, junction box 32, cord 38 and connector 42 to transfer panel 16, and from transfer panel 16 through the wiring in conduit 18 to main panel 12. In this manner, generator 10 functions to provide power to selected circuits of main panel 12 during a power outage.

In a preferred embodiment, the electrical generator 10 is caused to run automatically upon the interruption of utility power. In this regard, a customer is not required to manually start the electrical generator 10 to commence the supply of standby electrical power. As known in the art, when utility power is interrupted, the transfer panel 16 transmits a signal to the electrical generator 10 which causes the electrical generator 10 to start.

Turning now to FIGS. 2-5, electrical generator 10 has an enclosure 50 that is generally comprised of a base panel 52, end panels 54, 56, side panels 58, 60, and a cover or roof panel 62. The enclosure 50 further includes four corner panels 64, 66, 68, and 70. The end and side panels may include louvers 72 and 74, for example, for drawing air into and exhausting air from the interior volume formed by the enclosure 50. The end and side panels are supported uprightly by the base panel 52. Each corner panel is interfit between an end panel and an adjacent side panel, and includes channels 76, FIG. 8, into which panels are to be drop loaded when assembling the enclosure 50. Thumb screws 78 are used to fasten the roof panel 62 to the corner panels 64, 66, 68, and 70. The thumb screws 78 are designed to be hand tightened which allows a user, such as a homeowner or service technician, to remove the roof panel 62 in a tool-free manner. Additionally, since the end and side panels are drop-loaded into engagement with their respective corner panels, the end and side panels can be individually and independently raised and withdrawn from the base panel for servicing of the electrical generator 10.

With particular reference to FIGS. 2-7, an internal combustion engine 80, having a vertically oriented output shaft 82, and an alternator 84 are mounted within the interior volume of the enclosure using steel tubing 86. More particularly, the alternator 84 is coupled to the engine 80, which is supported by an upper portion of the steel tubing. In addition, a heat shield 88 and a muffler 90 are mounted to the alternator 84. A shroud 92 is coupled to the steel tubing to encase the muffler 90 between an inner surface of the shroud 92 and an outer surface of the heat shield 88. An air box 94 is provided and may be mounted to the engine or the steel tubing. The air box 94 preferably contains upper and lower members 94(*a*) and 94(*b*), and house an air filter 95. Rubber pads 96 are interconnected between the engine 80 and the steel tubing 86 to reduce vibration of the steel tubing during operation of the engine. A spacer ring 98 fits over the alternator 84.

The alternator 84 generally consists of a generally annular stator 100 and a rotor (not numbered) positioned radially inward of the stator. The adapter 98 and an upper portion 102(*a*) of a bearing carrier 102 define a housing for the stator 100. The rotor (not numbered) is coupled to the output shaft 82 of the engine 80 such that during operation of the engine 80, the rotor rotates to generate an electric current in the stator 100. The stator 100 is mounted directly to a lower portion of adapter 98 which is then coupled to the engine 80.

The electrical generator 10 includes a fan 104 that is disposed in a generally annular volume defined by the bearing carrier 102 and is coupled to rotor bolt 106 that is rotatably coupled to the rotor. In this regard, the fan 104 will rotate during operation of the engine 80 and the rotor (not numbered). Bolts 108 extend through bearing carrier 102 and elongated openings 110 formed in the outer surface of the spacer 98 and ultimately thread into holes (not numbered) formed in the lower portion of the engine 80 to couple the alternator to the engine. It will thus be appreciated that the alternator 84 is mounted between the engine 80 and the fan 104.

Figure 6:
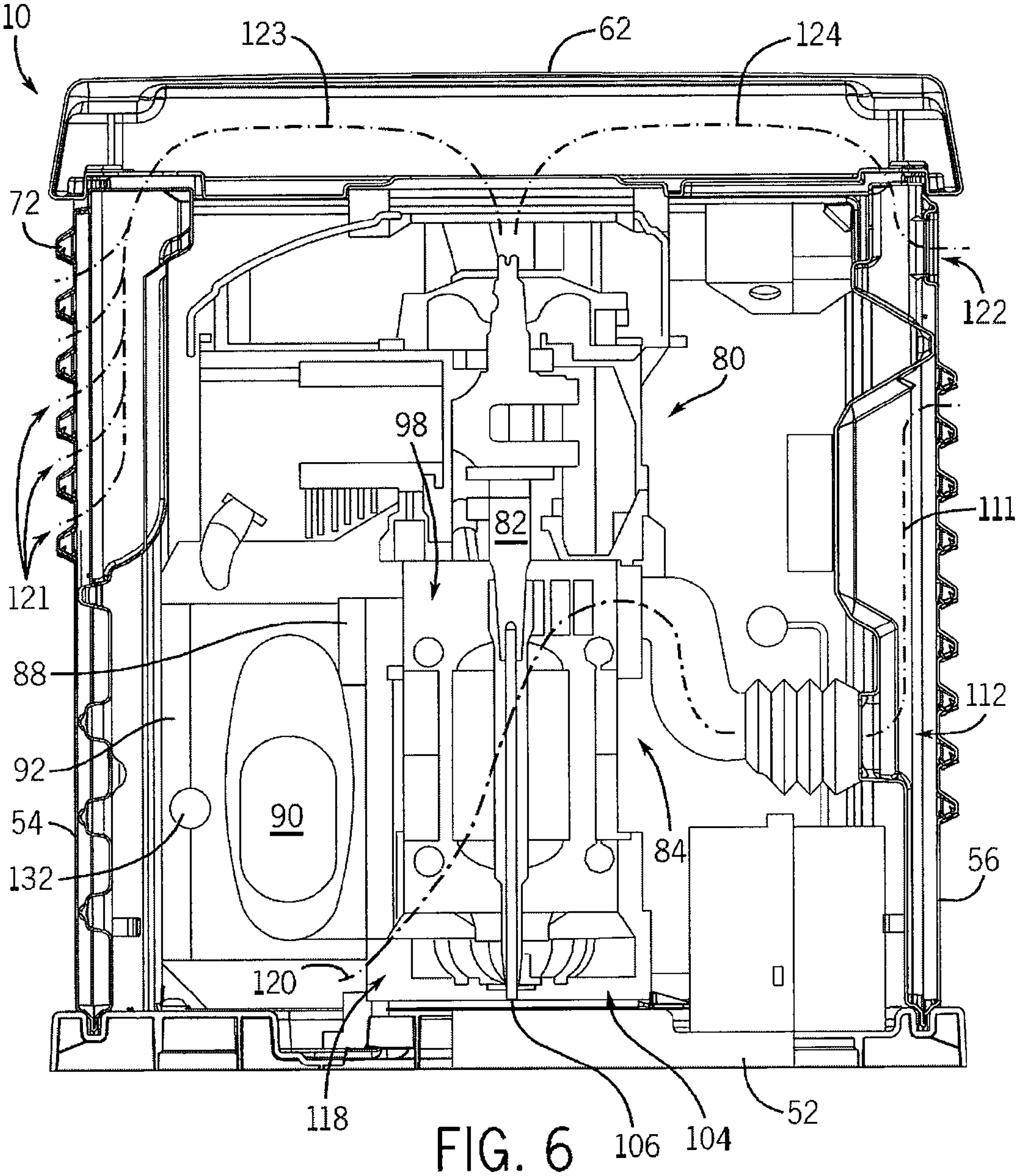
FIG. 6 is a section view of the electrical generator taken along line 6-7 of FIG. 2 and annotated to show an air flow path along which air can be drawn into the engine and alternator of the electrical generator.

Turning now to FIG. 6, during generator operation, air is drawn from outside the enclosure 50 through openings formed in end panels, e.g., louvers 72 in end panels 54 and 56 along air flow path 111, and through an air inlet 112 that is flow coupled to the alternator 84 by duct 114. In this regard, the drawn air passes through the duct 114 and through openings 116 formed in the spacer ring 98, and is pulled downward by rotation of the fan 104 past the rotor and out of the bearing carrier 102 at air outlets 118, generally along air flow path 120. The drawn air provides cooling for the alternator during its operation. After the air is passed through the alternator and blown through air outlet 118, some of the air passes over/around the muffler 90 to provide cooling for the muffler.

Figure 7:
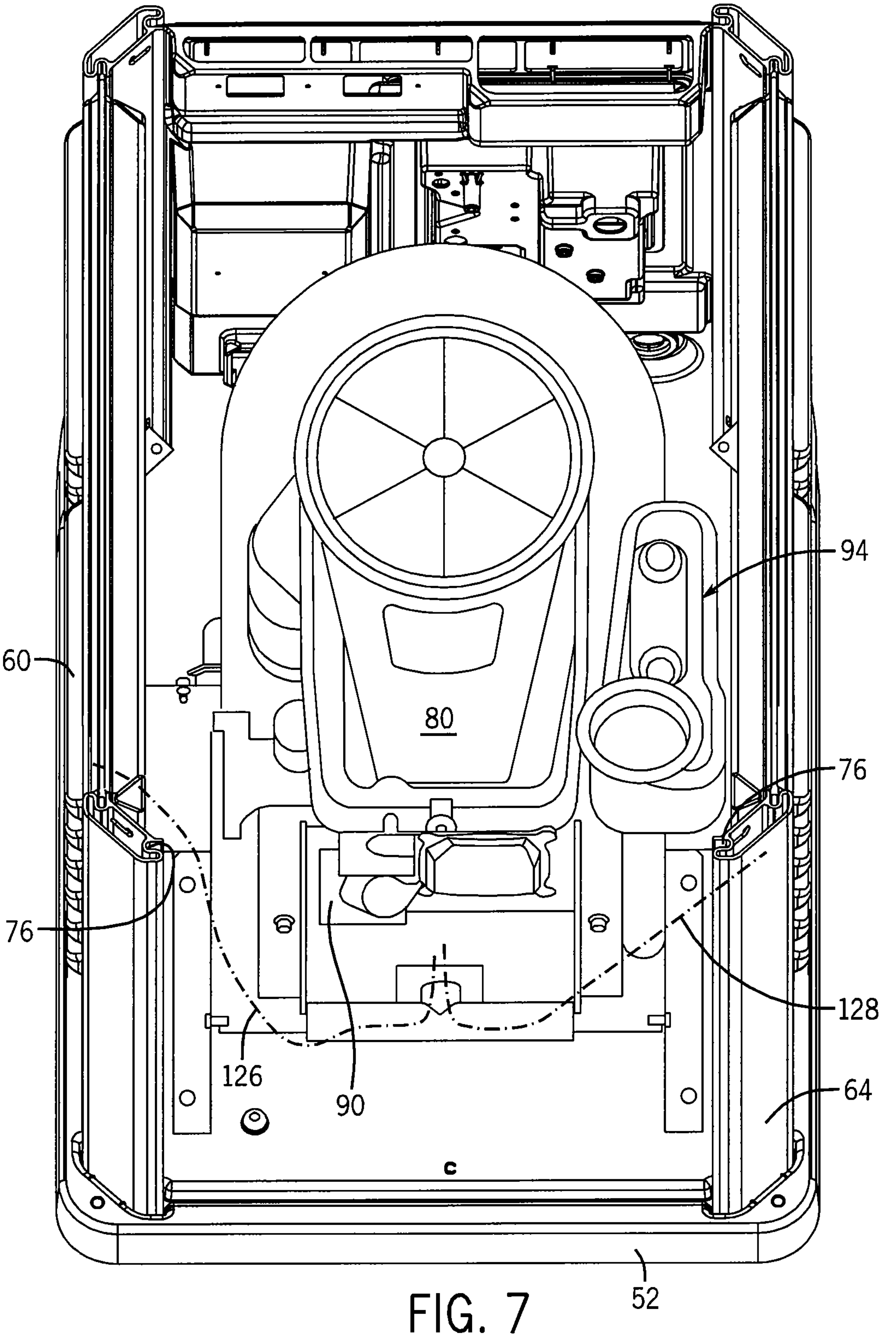
FIG. 7 is a top view of the electrical generator with a roof or cover panel removed and annotated to show a cooling air flow path to provide cooling air around a muffler.

Cooling air for the engine 80 is drawn through openings 121 and 122 formed in end panels 54, 56, respectively, and along flow paths 123 and 124, and is used to cool the engine during its operation. The cooling air that is passed through the engine is also directed toward the muffler 90 to provide cooling of the muffler 90 along flow paths 126 and 128, as shown in FIG. 7.

Figure 8:
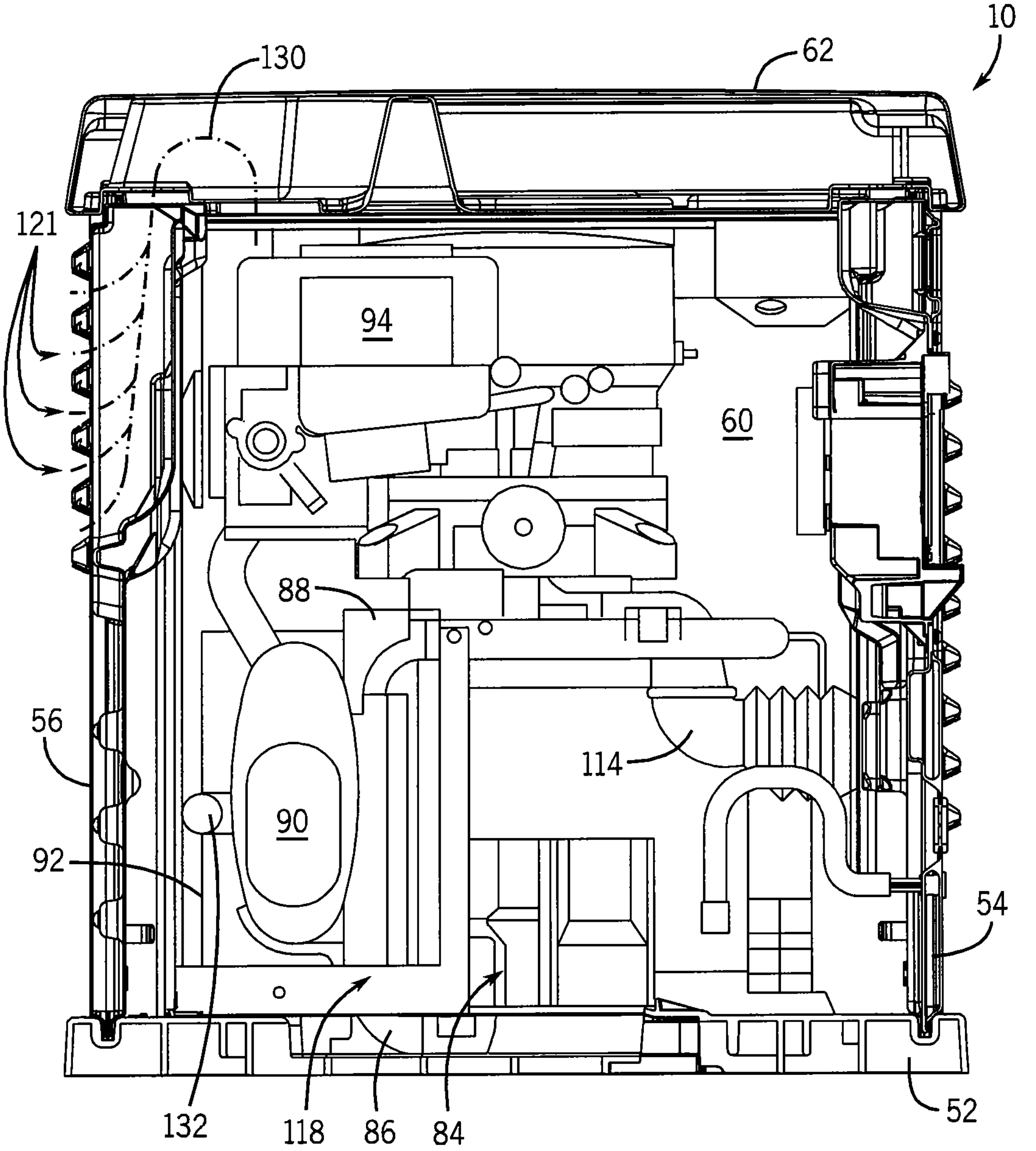
FIG. 8 is a section view similar to that shown in FIG. 6 but annotated to show an air flow path along which air can be drawn into an air box of the electrical generator.
Figure 9:
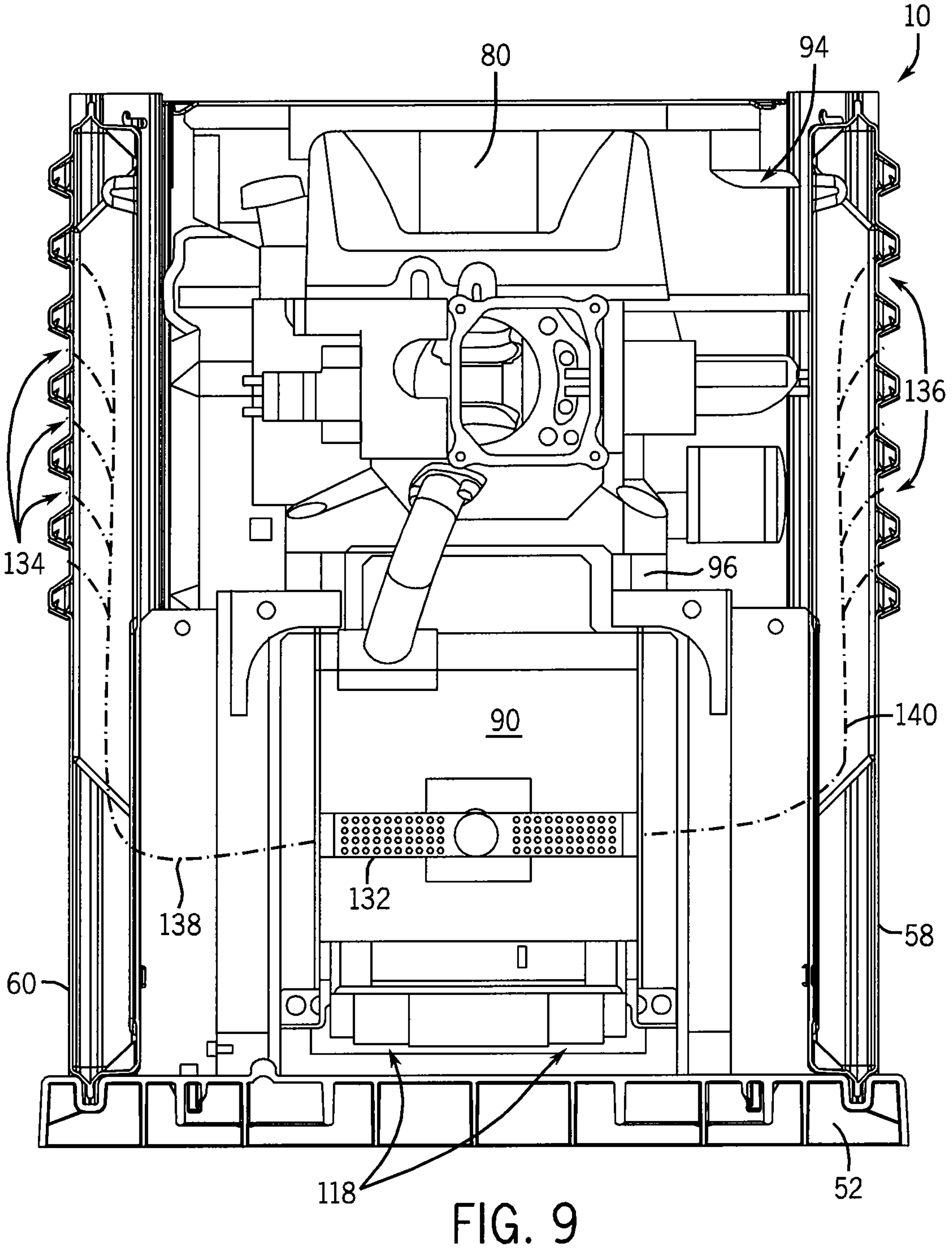
FIG. 9 is a section view of the electrical generator taken along line 9-9 of FIG. 2 and annotated to show an air flow path along which air exhausted from the electrical generator can be vented to atmosphere.

Turning to FIG. 8, air for combustion is also drawn through openings 121 formed in end panel 56 along air flow path 130. Air along the air flow path 130 is provided to the air box 94 whereupon the air is filtered by filter 95 before being used for combustion by the engine. Now referring to FIG. 9, exhaust from combustion is fed to the muffler 90 and ultimately exhausted through exhaust pipe 132. The exhaust pipe 132 then passes the exhausted air away from the alternator 84 toward the openings 134 and 136 formed in side panels 58 and 60 along flow paths 138 and 140 whereupon the exhausted air is passed to atmosphere. As shown in FIG. 9, the exhaust pipe 132 extends along a horizontal plane.

Many changes and modifications could be made to the invention without departing from the spirit thereof. The scope of these changes will become apparent from the appended claims.

The invention claimed is:

1. An electrical generator comprising:

an enclosure including a base panel, a plurality of upright panels extending uprightly from the base panel, and a roof panel coupled to the plurality of upright panels to form the enclosure defining an interior volume therein;

an internal combustion engine arranged in the interior volume of the enclosure, the internal combustion engine having an upper side and an underside;

an alternator operably connected to the underside of the internal combustion engine such that the internal combustion engine and the alternator are vertically aligned, the alternator generating electrical power during running of the internal combustion engine;

an alternator housing surrounding the alternator and arranged within the interior volume of the enclosure, the alternator housing including a first opening and a second opening in communication with the interior volume of the enclosure; wherein the first opening is proximal to the internal combustion engine for receiving air from outside of the enclosure for being directed through the alternator housing for cooling the alternator and the second opening is distal to the internal combustion engine for releasing the air from the alternator housing and into the interior volume of the enclosure prior to being discharged from the enclosure; and an engine and alternator cooling system configured to provide cooling air to the internal combustion engine and the alternator, the cooling system providing a first cooling path in which air is drawn through a first enclosure opening and is pulled downward proximal to the internal combustion engine to provide cooling for the engine and providing a second cooling path in which air is drawn through a second enclosure opening and is pulled downward through the first opening of the alternator housing to provide cooling for the alternator, wherein in the second cooling path, air is released from the second opening of the alternator housing to the interior volume of the enclosure to provide cooling in the enclosure prior to being discharged from the enclosure.

2. The electrical generator of claim 1 wherein the alternator includes a stator and a rotor, and wherein the stator is mounted to an underside of the internal combustion engine.

3. The electrical generator of claim 2 wherein the stator has a lower portion sealed by the base panel and an upper portion coupled to the internal combustion engine.

4. The electrical generator of claim 3 wherein the internal combustion engine has an output shaft coupled to the rotor, and wherein the output shaft extends along a vertical axis.

5. The electrical generator of claim 1 wherein:

the first enclosure opening is formed in a first upright panel of the enclosure and the second enclosure opening is formed in a second upright panel of the enclosure; and wherein some of the air that is passed proximal to the engine or the alternator is used to provide cooling for other components of the electrical generator contained within the enclosure.

6. The electrical generator of claim 5 further comprising an exhaust system to exhaust emissions of the internal combustion engine, the exhaust system providing an exhaust path in which exhaust from the internal combustion engine is directed toward one or more openings formed in the side panels.

7. The electrical generator of claim 6 wherein the exhaust system includes a muffler flow coupled to an exhaust side of the internal combustion engine and an exhaust pipe flow coupled to the muffler.

8. The electrical generator of claim 7 wherein the exhaust pipe includes an elongated body disposed laterally adjacent the muffler, the elongated body having first and second outlets, each of which passes exhaust toward respective side panels.

9. The electrical generator of claim 8 wherein the elongated body is parallel to a plane of the base panel.

10. The electrical generator of claim 1 further comprising a tubular frame to which the internal combustion engine is mounted, and further comprising rubber mounts interconnected between the tubular frame and the internal combustion engine.

11. An electrical generator comprising:

a generator housing defining an enclosure;

an internal combustion engine arranged inside of the enclosure and having an integrally formed mount; and an alternator positioned generally beneath the internal combustion engine and mounted directly to the integrally formed mount;

an alternator housing surrounding the alternator for directing cooling air therethrough, the alternator housing including an inlet and an outlet communicating with an interior of the enclosure, the inlet receiving air from outside the enclosure and delivering the air into the alternator housing at an end of the alternator housing proximal to the internal combustion engine and the outlet relatively being distal to the internal combustion engine for releasing the air from the alternator housing into the interior of the enclosure prior to being discharged from the enclosure; and an engine and alternator cooling system configured to provide cooling air to the internal combustion engine and the alternator, the cooling system providing a first cooling path in which air is drawn through a first generator housing opening and is pulled downward proximal to the internal combustion engine to provide cooling for the engine and providing a second cooling path in which air is drawn through a second generator housing opening and is pulled downward through the inlet to provide cooling for the alternator, wherein, in the second cooling path, air is released from the outlet of the alternator housing to the interior of the enclosure to provide cooling in the interior of the enclosure prior to being discharged from the enclosure.

12. The electrical generator of claim 11 wherein the housing includes a base panel, a plurality of side and end panels extending uprightly from the base panel, a plurality of corner panels, and a roof panel coupled to the plurality of corner panels.

13. The electrical generator of claim 12 wherein each corner panel includes first and second slots configured to receive an edge of a side panel and an edge of an end panel.

14. The electrical generator of claim 11 wherein:

the first generator housing opening is formed in a first end panel of the enclosure and the second generator housing opening is formed in a second end panel of the enclosure; and wherein some of the air that is passed proximal to the engine or the alternator is used to provide cooling for other components of the electrical generator contained within the enclosure.

15. The electrical generator of claim 14 further comprising an exhaust system to exhaust emissions of the internal combustion engine, the exhaust system providing an exhaust path in which exhaust from the internal combustion engine is directed toward one or more openings formed in at least one of the side and end panels.

16. The electrical generator of claim 15 wherein the exhaust system includes a muffler flow coupled to an exhaust side of the internal combustion engine and an exhaust pipe flow coupled to the muffler, wherein the exhaust pipe includes an elongated body disposed laterally adjacent the muffler, wherein the elongated body has first and second outlets, each of which passes exhaust toward respective side panels, and wherein the elongated body is parallel to a plane of a base panel.

17. An electrical generator comprising:

an engine and an alternator operatively associated with the engine to create electric power during operation of the engine;

an enclosure for the engine and the alternator, the enclosure having a base panel, a roof panel, and a plurality of upright panels interconnected between the base panel and the roof panel, and wherein openings are formed in at least one of the upright panels;

an engine and alternator cooling system configured to provide cooling air to the engine and the alternator, the cooling system providing a first cooling path in which air is drawn through a first opening formed in a first upright panel of the enclosure and is pulled downward proximal to the engine to provide cooling for the engine and providing a second cooling path in which air is drawn through a second opening formed in a second upright panel of the enclosure and is pulled downward from a location adjacent to the engine through the alternator to provide cooling for the alternator, the second cooling path being directed at least in part by an alternator housing arranged outwardly of the alternator and within the enclosure; and wherein:

the alternator housing includes an inlet and an outlet communicating with an interior of the enclosure, the inlet being proximal to the engine for receiving air therein for cooling the alternator and the outlet being distal to the engine for releasing the air from the alternator housing into the enclosure prior to being discharged from the enclosure, wherein, in the second cooling path, air is released from the outlet of the alternator housing to the interior of the enclosure to provide cooling in the interior of the enclosure prior to being discharged from the enclosure; and some of the air that is passed proximal to the engine or the alternator is used to provide cooling for other components of the electrical generator contained within the enclosure.

18. The electrical generator of claim 17 further comprising an exhaust system to exhaust emissions of the internal combustion engine, the exhaust system providing an exhaust path in which exhaust from the internal combustion engine is directed toward one or more openings formed in the upright panels.

19. The electrical generator of claim 18 wherein the exhaust system includes a muffler flow coupled to an exhaust side of the internal combustion engine and an exhaust pipe flow coupled to the muffler, wherein the exhaust pipe includes an elongated body disposed laterally adjacent the muffler, wherein the elongated body has first and second outlets, each of which passes exhaust toward respective upright panels, and wherein the elongated body is parallel to a plane of the base panel.

20. The electrical generator of claim 17 wherein the engine and the alternator are mounted to one another and in a vertical orientation such that the engine sits generally above the alternator.

* * * * *